United States Patent [19]

Arndt

[11] 4,103,386

[45] Aug. 1, 1978

[54] LOCKING CLIP

[75] Inventor: John J. Arndt, Chesterton, Ind.

[73] Assignee: The Anderson Company, Gary, Ind.

[21] Appl. No.: 776,997

[22] Filed: Mar. 14, 1977

[51] Int. Cl.$^2$ ............................................. B60S 1/04
[52] U.S. Cl. .................................................. 15/250.42
[58] Field of Search ...................... 15/250.32–250.42

[56] References Cited

U.S. PATENT DOCUMENTS

| 3,408,679 | 11/1968 | Deutscher et al. | 15/250.42 X |
| 3,644,957 | 2/1972 | Deibel et al. | 15/250.42 |
| 3,879,792 | 4/1975 | Brummer et al. | 15/250.42 |
| 3,935,612 | 2/1976 | Wittwer | 15/250.42 |

FOREIGN PATENT DOCUMENTS 1,089,210  11/1967  United Kingdom .................. 15/250.42

Primary Examiner—Peter Feldman
Attorney, Agent, or Firm—Wegner, Stellman, McCord, Wiles & Wood

[57] ABSTRACT

In a pressure-distributing superstructure for a wiper blade having at least two parts connected together with one part having a pair of spaced laterally aligned claws extending inwardly toward each other and adapted to be positioned about the other part on either side thereof. A locking clip is positioned in abutting relationship with the undersurface of the other part to retain the claws on said one part in assembled relation with the other part. The locking clip is flexible and has a mounting portion with attaching means at the free ends of the legs thereof for interlocking engagement with the other part. The locking clip may be engaged or disengaged by deflection of the leg. The locking clip also has a latching portion with legs in which recesses are formed and through which recesses the respective claws extend. Each claw engages the undersurface of its respective leg so as to maintain a connection between the parts. The parts may be assembled or disassembled by effecting deflection of the latching portion legs. Cam surfaces are provided to effect automatic deflection of the legs when the superstructure is assembled.

11 Claims, 5 Drawing Figures

LOCKING CLIP

BACKGROUND OF THE INVENTION

1. Field of the Invention

This invention relates generally to an improved windshield wiper blade assembly and, more particularly, to a locking clip for effecting engagement between the primary yoke and the secondary yoke of a wiper blade assembly.

2. Description of the Prior Art

Typically, a windshield wiper blade assembly for automobiles and the like includes a resilient wiper blade and a pressure-distributing superstructure. The superstructure has a primary yoke (bridge) moved across the windshield by a wiper arm and secondary yokes (links) carrying the wiper blade which may be connected at one or both ends of the primary yoke.

Heretofore, many means have been employed to provide a connection between the various parts of the superstructure. For example, where the primary and secondary yokes are channel-shaped and assembled in nested relation, a rivet extending transversely through the respective walls of the primary and secondary yokes provided a flexible pivotal connection therebetween. Alternatively, where the overlying primary yoke is provided with claws or fingers which engage slots formed in the side walls of the secondary yoke, a releasable button-type mechanism suitably retained the claws within the slot and maintained the connection therebetween.

However, these prior art methods require that the manufacturer thereof adhere to somewhat small tolerance levels so that problems in assembling this relatively inexpensive item are minimized. However, because of the small size of the parts and necessity of reducing costs thereon, elimination of assembly problems resulting from ill-fitting parts is almost impossible. Further, such methods generally result in a noisy metal-to-metal connection which cannot easily be silenced.

SUMMARY OF THE INVENTION

It is therefore a principal object of the invention to provide a means for eliminating the necessity for close tolerances between bridge and link connections in a windshield wiper assembly. It is a further object of the invention to provide a one-piece locking clip which may be integrally molded from plastic and maintains a functional and quiet connection.

In accordance with the invention, the primary yoke has a pair of cooperating laterally spaced claws at the end thereof adapted to overlie the secondary yoke. A locking clip formed from resilient material is fixedly disposed under the secondary yoke and has a pair of laterally spaced recesses formed therein adapted to receive the claws so that the claws engage the locking clip and are prevented from moving relative thereto. The locking clip includes a mounting portion having a pair of spaced legs joined at one end and a latching portion having a pair of laterally spaced legs joined at one end. The inherent resiliency of the clip permits the respective legs to be forcibly moved together and causes the legs, when released, to return to their natural position.

Herein, the mounting portion legs include attaching means, such as tabs, which resiliently engage the secondary yoke to releasably lock the clip thereto. Similarly, the recesses are formed in the edges of the latching portion legs to releasably engage the claws of the primary yoke thereby providing an effective latch holding the yokes together.

In an exemplary embodiment of the invention, the secondary yoke includes an aperture through which the mounting portion is inserted. The tabs have camming surfaces so that during insertion, the mounting portion legs are automatically urged together. When the tabs extend past the aperture to the upper surface of the secondary yoke, the tabs spring outward to prevent withdrawal thereof.

Similarly, the latching portion legs define a constricted segment and a pair of oppositely extending ears between the constricted segment and the respective recesses. Each ear has a cam surface extending outwardly from the constricted segment. During assembly when the claws of the primary yoke are placed over the secondary yoke, the claws extend past the constricted segment to a point below the clip. When the claws are moved toward their respective recesses, the claws react on the cam surfaces to automatically urge the latching portion legs together. When the claws are in proper position within the recess, the legs spring outward to engage the claws, the claws engaging the undersurface of the clip thereby latching the primary and secondary yokes together.

In a preferred embodiment, operating tabs extend laterally outward from each of the latching portion legs to a point outward of the yokes to facilitate manual closure of the legs during disassembly of the yokes.

BRIEF DESCRIPTION OF THE DRAWINGS

The details of construction and operation of the invention are more fully described with reference to the accompanying drawings which form a part hereof and in which like reference numerals refer to like parts throughout.

In the drawings.

DESCRIPTION OF THE PREFERRED EMBODIMENT

Figures 1, 2, 3, 4, 5:
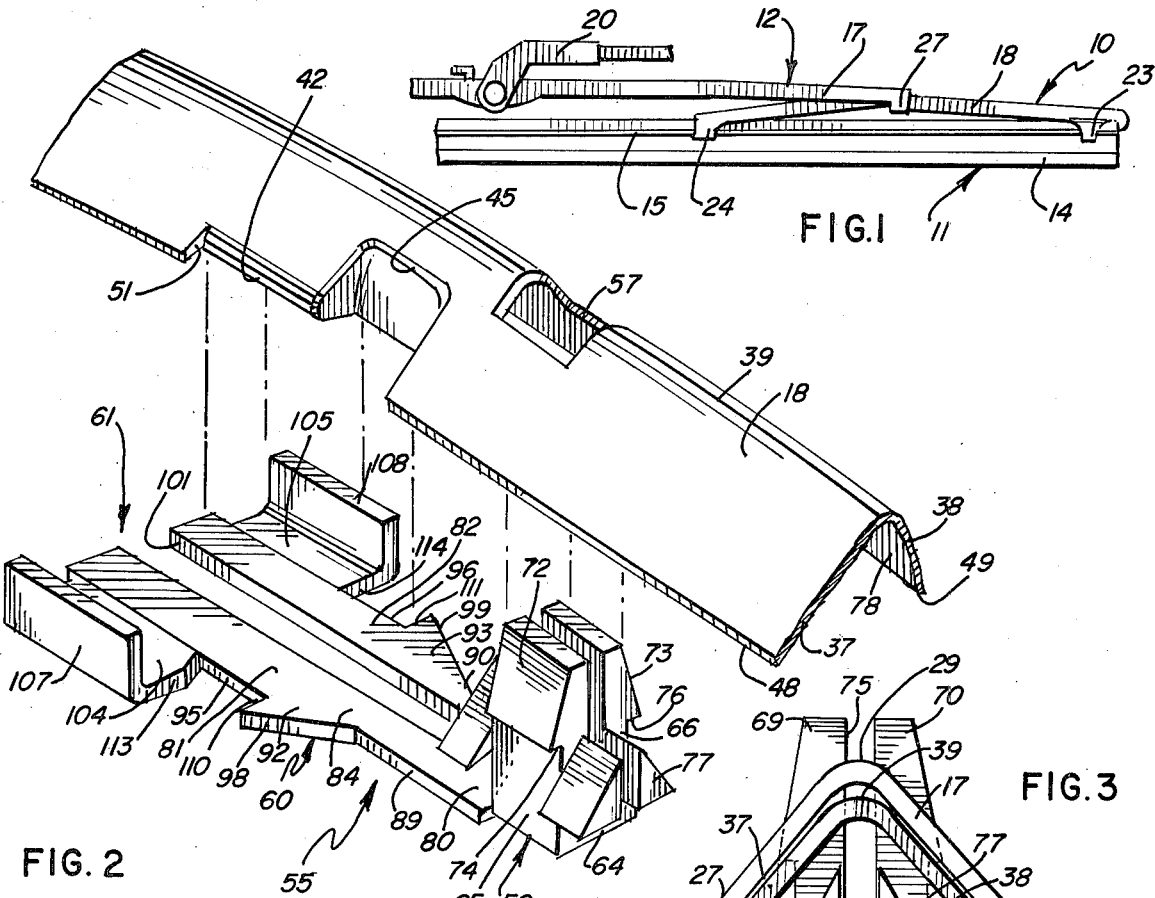
FIG. 1 is an elevational view of a portion of a windshield wiper blade assembly in which the locking clip of the invention may be incorporated.
FIG. 2 is an enlarged exploded perspective view of a locking clip constructed in accordance with the invention and a portion of the secondary yoke configured to cooperate with the locking clip.
FIG. 3 is an enlarged, cross-sectional view of a windshield wiper blade assembly taken along line 3—3 of FIG. 4 and showing the assembled relationship between the primary yoke, the secondary yoke and the locking clip.
FIG. 4 is a fragmentary top plan view of the primary yoke, the secondary yoke and the locking clip in assembled relation.
FIG. 5 is an elevational view showing the primary yoke, the secondary yoke and the locking clip in assembled relation with portions of the secondary yoke being broken away.

Referring to FIG. 1, the windshield wiper blade assembly 10 to which the invention generally pertains is seen to include a windshield wiper blade 11 and a pressure-distributing superstructure 12. The wiper blade 11 includes a resilient rubber-like element 14 connected with an elongate flexible backing strip or flexor 15. The flexor 15 is flexible in a plane perpendicular to a windshield and is substantially inflexible in a plane parallel to the windshield. The pressure-distributing superstructure 12 includes a primary yoke or bridge 17 having its ends connected to an intermediate portion of a secondary yoke or link, one of which is shown and designated 18. The primary yoke 17 is pivotally connected to a windshield wiper arm 20 at an intermediate portion thereof. The wiper arm 20, and with it the wiper blade 10, is moved back and forth across the surface of the windshield which is to be wiped. The secondary yoke 18 is slidably connected with the flexor 15 of the wiper blade 11 via outboard claws 23 and inboard claws 24.

The primary yoke 17 is shown made of metal, or of a similar substantially rigid material including a plastic material, and is channel-shaped in cross section so as to resemble an inverted "V" having side walls 27 and 28 which merge at an apex 29. At the outward end of the primary yoke 17 are oppositely-disposed, aligned claws or ears 31 and 32 which define a narrowed opening 34 therebetween.

The secondary yoke 18, which may also be made of metal or of plastic, is adapted to have its intermediate portion fitted between the side walls 27 and 28 of the outer end portion of the primary yoke 17. As is most clearly shown in FIGS. 2 and 3, the secondary yoke 18 has side walls 37 and 38 which are joined together at an apex 39 such that the secondary yoke 18 has an inverted V-shaped cross section corresponding to the configuration of the primary yoke 17. Formed contiguously in the respective side walls 37 and 38 of the secondary yoke 18 are aligned inboard recesses 42 and 43 and outboard recesses 45 and 46. The outboard recesses 45 and 46 extend a greater distance inward from the respective edges 48 and 49 of the respective side walls 37 and 38 than do the inboard recesses 42 and 43 and are spaced apart a distance slightly less than the opening 34 between the claws 31,32. The edges of the recesses 42,43 are spaced apart a greater distance than the opening 34 between the claws 31,32.

When the primary yoke 17 and the secondary yoke 18 are assembled, the claws 31 and 32 may be inserted into the outboard recesses 45 and 46. Thereafter, the primary yoke 17 is moved inboard relative to the secondary yoke 18 so that the claws 31 and 32 lie generally adjacent the respective inboard shoulders 51 of the recesses 42 and 43 and are partially wrapped around the side walls 37 and 38. To insure that this relationship between the primary yoke 17 and the secondary yoke 18 is maintained, a locking clip 55 is employed.

The locking clip 55 is connected to the secondary yoke 18 via a somewhat rectangular aperture 57 formed between the side walls 37 and 38 across the apex 39, as will be explained in greater detail hereinafter. The locking clip 55 is primarily comprised of a mounting portion, generally designated 59, a primary yoke latching portion, generally designated 60, and an operator releasing portion, generally designated 61. Preferably, the locking clip 55 is integrally molded from inherentlyresilient flexible material such as plastic.

The mounting portion 59 has a generally U-shaped configuration defined by a crosspiece 64 and a pair of laterally spaced legs 65 and 66 which depend from the crosspiece 64 and extend upwardly therefrom. The legs 65 and 66 each have an attaching means, such as tabs or barbs 69 and 70, respectively, for effecting interlocking relationship between the locking clip 55 and the secondary yoke 18 to prevent relative movement therebetween. The tabs 69 and 70 each have a cam surface 72 and 73, respectively, which tapers outwardly from the upper free end of its respective leg to its lower end to form shoulders 74,76, respectively, therewith. The tabs 69 and 70, when closed together, have a lateral width which is less than the width of the aperture 57 so that the mounting portion 59 may be inserted into the aperture 57. The cam surfaces 72 and 73 automatically urge the legs 65 and 66 together during insertion. When the tabs 69 and 70 have been moved completely through the aperture 57, the inherent resiliency of the mounting portion 59 causes the tabs 69 and 70 to move apart toward their natural position with the shoulders 74,76 bearing on the edges of the aperture 57. The tabs 69 and 70 will then have a width which is greater than the width of the aperture 57 so as to prevent withdrawal of a mounting portion 59 from the aperture 57.

When the mounting portion 59 is to be withdrawn from the aperture 57, the operator may manually move the tabs 69 and 70 together closing the space 75 between the legs 65 and 66 and removing the shoulders 74,76 from the edges of the aperture 57, whereupon the tabs 69 and 70 are moved back through the aperture 57. Abutment members 77 are carried by each of the legs 65 and 66 and are configured to engage the undersurface 78 of the secondary yoke 18 to limit the extent of the insertion of the mounting portion 59 into the aperture 57.

The latching portion 60 has a generally U-shaped configuration defined by a crosspiece 80 and a pair of laterally spaced legs 81 and 82 depending from the crosspiece 80. The crosspiece 80 is joined to the crosspiece 64 of the mounting portion 59 and, when assembled with the yoke 18, the legs 81 and 82 generally extend along the bottom of the secondary yoke 18 so as to underlie the primary yoke 17. The upper surface 84 of the legs 81 and 82 abut the lower edges of the outboard recesses 45 and 46.

The latching portion 60 has an outboard constricted segment partially defined by lateral edges 89 and 90 of the legs 81 and 82, an enlarged projecting segment defined by the tapered ears 92 and 93 carried by the legs 81 and 82, and an inboard constricted segment defined by respective recesses 95 and 96. The lateral width of the clip 55 at the outboard constricted segment defined by edges 89,90 is less than the width of the opening 34 defined by the claws 31 and 32. In contrast, the lateral width of the latching portion 60 across the inboard constricted segment defined by recesses 95,96 is greater than said opening 34.

When the mounting portion 59 is received within the aperture 57, the outboard constricted segment defined by edges 89,90 is aligned with the outboard recess 45 and the inboard constricted segment defined by recesses 95,96 is generally aligned with the inboard recesses 42 and 43. During assembly of the primary yoke 17 and the secondary yoke 18, the claws 31 and 32 are moved downwardly through the outboard recesses 45 and 46 past the lateral edges 89 and 90. Thereafter, the claws 31 and 32 are moved rearwardly against the cam surfaces 98 and 99 of the tapered ears 92 and 93, respectively, so that the legs 81 and 82 are automatically moved together to close the space 101 defined therebetween. When the legs 81 and 82 are moved together, the claws 31 and 32 can be moved past the ears 92 and 93 and be received within the inboard constricted segment defined by recesses 95 and 96. In this position, the claws 31 and 32 extend through the inboard recesses 42 and 43 of the secondary yoke 18. The inherent resiliency of the locking clip 55 causes the legs 81 and 82 to be moved laterally outward against the claws 31 and 32 so that the claws 31 and 32 react on the undersurface 102 of the legs 81 and 82. As a result, the primary yoke 17 cannot be moved upwardly away from the secondary yoke 18.

The operator releasing portion 61 includes operating tabs 104 and 105 carried by the legs 81 and 82, respectively, at their free ends, the respective operating tabs 104 and 105 are offset downward from the legs 81 and 82 and extend laterally outward therefrom below the edges 48 and 49 of the secondary yoke 18. The operating tabs 104 and 105 have upwardly extending flange portions 107 and 108, respectively, to facilitate manipulation by an operator. When the operating tabs 104 and 105 are squeezed together, the claws 31 and 32 of the primary yoke 17 may be moved forwardly past the shoulders on the ears 92 and 93 so that the primary yoke 17 may eventually be disengaged from the secondary yoke 18.

The recesses 95 and 96 have outboard shoulders 110 and 111 defined by the ears 92 and 93, respectively, and inboard shoulders 113 and 114 defined by the operating tabs 104 and 105, respectively. When the primary yoke 17 and the secondary yoke 18 are assembled, the claws 31 and 32 will be confined to limited longitudinal movement inwardly or outwardly relative to the secondary yoke 18 by the respective shoulders. The shoulders 113 and 114 of the locking clip 55 and the shoulders 51 defined on the secondary yoke 18 prevent the claws 31 and 32 from moving inboard, while the shoulders 110 and 111 of the locking clip 55 prevent the claws 31 and 32 from moving outboard.

As seen in FIG. 5, the locking clip 55, when in the final position to prevent disengagement of the primary yoke 17 and the secondary yoke 18, is bowed upwardly as a result of the reaction of the claws 31 and 32 on the undersurface 102 of the latching portion 60.

I claim:

1. In a pressure-distributing superstructure for a wiper blade having at least two generally elongate parts connected together, one of said parts having a pair of spaced apart lateral walls near at least one end with laterally aligned claws extending from each wall inwardly toward each other to define an opening therebetween, said opening being of such size to permit said one part to be positioned over the other part with said claws being spaced laterally on each side of said other part, a locking clip positioned in abutting relationship with the undersurface of said other part for maintaining said parts in assembled relationship, said locking clip comprising:

a mounting portion of resiliently flexible material having a pair of spaced legs connected together at one end thereof and attaching means at the free ends of the legs for interlocking engagement with said other part to prevent relative movement between said clip and said other part; and a latching portion of resiliently flexible material having a pair of laterally spaced legs connected together at one end thereof and joined to and extending longitudinally from said one end of said mounting portion, each latching portion leg having a recess in its lateral edge defining opposing shoulders between which a respective claw extends, each claw engaging the undersurface of its respective leg to prevent relative movement of said one part away from said clip and being maintained between said shoulders to retain said other part in position relative to said latching portion whereby said parts may be assembled or disassembled by closing said latching portion legs together and moving said claws into or out of said recesses.

2. The locking clip of claim 1 wherein said other part has an aperture formed therein and said mounting portion has a tab extending laterally outward from each leg, said tabs having a lateral width less than said aperture when closed together to permit insertion thereof through said aperture and inherently having a lateral width greater than said aperture to prevent withdrawal of said mounting portion from said aperture when inserted therepast.

3. The locking clip of claim 2 wherein each of said tabs has a cam surface tapering outwardly from its upper end at the free end of its respective leg to its lower end whereby, during insertion, said mounting portion is guided into said aperture and said mounting portion legs are automatically urged together.

4. The locking clip of claim 1 wherein each latching portion leg includes a segment separated from said recess by an ear which projects laterally outward from said recess and said segment, the lateral width of said clip at said segment being less than the width of said claw opening, each of said ears having a cam surface tapering outwardly from said segment to the edge of said recess whereby relative movement of said claws from a position adjacent said segment toward said recess urges said latching portion legs together thereby permitting said claws to be moved into said recesses.

5. The locking clip of claim 1 further including an operating tab carried at the free end of each latching portion leg, said operating tabs extending laterally outward from each side of said other part whereby said latching portion legs may be manually closed together by squeezing said operating tabs.

6. The locking clip of claim 1 wherein said mounting portion and said latching portion are both generally U-shaped and are joined together at their respective crosspieces.

7. The locking clip of claim 6 wherein said mounting portion and said latching portion are generally perpendicular to each other, said mounting portion extending generally upwardly into engagement with said other part from a position thereunder and said latching portion extending generally along the bottom of said other part.

8. The locking clip of claim 1 wherein said locking clip is integrally formed from molded plastic.

9. In a pressure-distributing superstructure for a wiper blade having at least two generally elongate parts connected together, a pair of aligned claws formed on at least one end portion of one of said parts, said claws passing through a reduced sized portion of said other part, a locking clip carried by said other part for maintaining said parts in assembled relationship comprising:

said clip having a mounting portion with a pair of laterally spaced legs extending from a crosspiece and interlocking with said other part to prevent relative movement between said clip and said other part; and said clip having a latching portion with a pair of laterally spaced legs extending longitudinally from said mounting portion, means formed in each latching portion leg for receiving a respective claw therein, whereby said parts may be assembled or disassembled by closing said latching portion legs together and moving said claws into or out of said means.

10. In a pressure-distributing superstructure for a wiper blade having at least two generally elongate parts connected together, one of said parts having a pair of spaced lateral walls near at least one end portion with laterally aligned claws extending from each wall inwardly toward each other to define an opening therebetween, said one part being adapted to be positioned partially over the other part with said claws thereof being spaced laterally on each side of said other part, said other part having an enlarged portion defining a shoulder on each side thereof to prevent movement of said claws therepast, a locking clip positioned in abutting relationship with the undersurface of said other part for maintaining said parts in assembled relationship comprising:

a mounting portion of resiliently flexible material having a pair of legs connected together at one end thereof and attaching means at the free ends of the legs for interlocking engagement with said other part to prevent relative movement between said clip and said other part; and a latching portion of resiliently flexible material having a pair of laterally spaced legs connected together at one end thereof and joined to and extending longitudinally from said mounting portion, each latching portion leg having an enlarged segment defining a shoulder on the lateral edge thereof spaced from the enlarged portion of said other part when the locking clip is engaged with said other part, respective claws extending through the space defined between said respective shoulders and engaging the undersurface of its respective leg to prevent relative movement of said one part away from said clip, said claws being maintained between said respective shoulders to retain said other part in position relative to said other part, whereby said parts may be assembled or disassembled by closing said latching portion legs together and moving said claws into or out of postion between said shoulders.

11. In a wiper assembly having a wiper blade and a pressure-distributing superstructure operatively connected to the blade, the superstructure including a primary yoke and at least one secondary yoke, each of said yokes having oppositely disposed side walls, said primary yoke having claws extending downwardly and inwardly from its side walls to define an opening therebetween, a portion of said secondary yoke having a lateral width less than that of said opening such that said claws extend partially thereabout when said primary yoke is positioned thereover, and a locking clip positioned on one side of said secondary yoke opposite said primary yoke to maintain said primary and secondary yoke is assembled relation, said clip comprising:

a generally U-shaped mounting portion having a pair of laterally spaced legs depending from a crosspiece, said legs extending from said crosspiece to said secondary yokes and having attaching means for effecting interlocking engagement between said clip and said secondary yoke to prevent relative movement therebetween; and a generally U-shaped locking portion having a crosspiece joined with said mounting portion crosspiece and a pair of laterally spaced legs depending from its crosspiece and extending along the one side of said secondary yoke, said locking portion having a constricted segment defined by recesses in the laterally outward edges thereof, said constricted segment having a lateral width greater than that of said opening, said claws extending respectively through said recesses and engaging the undersurface of said clip, said clip thereby preventing disengagement of said primary and secondary yokes, said clip being formed from resilient material so that said clip may be disengaged from said secondary yoke and said claws disengaged from said clip by manually effecting deflection of the respective legs.

* * * * *